United States Patent
Romzek

Patent Number: 5,890,467
Date of Patent: Apr. 6, 1999

[54] METHOD FOR INTERNAL COMBUSTION ENGINE START-UP

[75] Inventor: Martin Anthony Romzek, Northville, Mich.

[73] Assignee: Detroit Diesel Corporation, Detroit, Mich.

[21] Appl. No.: 695,907

[22] Filed: Aug. 12, 1996

[51] Int. Cl.$^6$ ............................ F02D 17/02; F02D 41/06; F02M 45/02

[52] U.S. Cl. ............................ 123/299; 123/481; 123/491

[58] Field of Search ......................... 123/179.16, 179.17, 123/198 F, 299, 300, 481, 491

[56] References Cited

U.S. PATENT DOCUMENTS

| | | | |
|---|---|---|---|
| 3,722,480 | 3/1973 | Araya et al. | 123/299 X |
| 3,827,419 | 8/1974 | Isomura | 123/300 |
| 3,896,779 | 7/1975 | Omori et al. | 123/481 X |
| 3,977,376 | 8/1976 | Reid et al. | 123/550 |
| 4,096,839 | 6/1978 | Nieritit | 123/704 |
| 4,150,651 | 4/1979 | Wade et al. | 123/198 F X |
| 4,176,624 | 12/1979 | Bielecki et al. | 123/90.11 |
| 4,204,510 | 5/1980 | Ritter et al. | 123/179.16 |
| 4,253,435 | 3/1981 | McCandless | 123/193.6 |
| 4,327,689 | 5/1982 | Rachel | 123/436 |
| 4,492,204 | 1/1985 | Bertsch et al. | 123/685 |
| 4,640,241 | 2/1987 | Matsunaga | 123/198 F |
| 4,777,924 | 10/1988 | Fujimura et al. | 123/678 |
| 4,928,642 | 5/1990 | Atkinson et al. | 123/179.7 |
| 4,938,180 | 7/1990 | King | 123/179.15 |
| 4,944,260 | 7/1990 | Shea et al. | 123/179.21 |
| 5,035,212 | 7/1991 | Hudson et al. | 123/323 |
| 5,094,198 | 3/1992 | Trotta et al. | 123/179.21 |
| 5,195,485 | 3/1993 | Jensen et al. | 123/198 F |
| 5,203,830 | 4/1993 | Faletti et al. | 123/90.11 X |
| 5,213,083 | 5/1993 | Glassey | 123/447 |
| 5,231,962 | 8/1993 | Osuka et al. | 123/299 |
| 5,331,937 | 7/1994 | Clarke | 123/491 |
| 5,359,883 | 11/1994 | Baldwin et al. | 73/117.3 |
| 5,367,996 | 11/1994 | Homik et al. | 123/179.8 |
| 5,408,975 | 4/1995 | Blakeslee et al. | 123/491 |
| 5,441,030 | 8/1995 | Satsukawa | 123/491 |
| 5,445,128 | 8/1995 | Letang et al. | 123/436 |
| 5,445,129 | 8/1995 | Barnes | 123/446 |
| 5,447,138 | 9/1995 | Barnes | 123/446 |
| 5,456,219 | 10/1995 | Clarke | 123/42 |
| 5,463,996 | 11/1995 | Maley et al. | 123/446 |
| 5,465,701 | 11/1995 | Hunt | 123/531 |
| 5,474,053 | 12/1995 | Suzuki | 123/685 |
| 5,482,023 | 1/1996 | Hunt et al. | 123/491 |
| 5,492,100 | 2/1996 | Ishii et al. | 123/481 |

*Primary Examiner*—Tony M. Argenbright
*Attorney, Agent, or Firm*—Bill C Panagos

[57] ABSTRACT

A method for engine start-up reducing white smoke and the start-to-idle time. The method includes the combination of producing two sub-fuel injections into the cylinders of the internal combustion engine at different points in the position of at least one injection valve of the engine and reducing the number of combusting cylinders in half. The two sub-fuel injections reduce the start-to-idle time. Once the engine is idling, the half cylinder operation reduces the white smoke emitted therefrom. The two sub-fuel injections are also employed when in half cylinder operation to reduce noise.

4 Claims, 7 Drawing Sheets

METHOD FOR INTERNAL COMBUSTION ENGINE START-UP

BACKGROUND OF THE INVENTION

1. Field of the Invention

The invention relates to internal combustion engines for motor vehicles. More specifically, the invention relates a method for reducing white smoke and the start-to-idle time of internal combustion engines for motor vehicles.

2. Description of the Related Art

Fuel efficiencies and pollutants are two great concerns for consumers and environmental advocates alike. Thus, there is an almost continuous effort to increase efficiencies and reduce pollutants in the automotive industry. Internal combustion engines which combust diesel fuel take a greater time to reach an idle speed (in revolutions per minute) from a cold start than comparable spark ignition engines. This factor increases the consumption of fuel by such diesel powered engines. U.S. Pat. No. 5,465,701, issued to Hunt on Nov. 14, 1995, addresses the cold start issue for internal combustion engines in general. This reference discloses a fuel control system wherein a cold start fuel injector is mounted in an air intake passageway downstream from a throttle for the internal combustion engine. A three way air valve has an air inlet fluidly connected to the air intake upstream from the throttle. An engine control unit controls the actuation of the air valve and fluidly connects an inlet to a first outlet, a second outlet or both outlets. In addition, the air valve may close fluid communication between the inlet and the outlets. This device is undesirable because it introduces new hardware which must be coordinated with the operation of other necessary components of the internal combustion engine. More specifically, the fuel injector and the air valve must be coordinated such that the fuel injector and the air valve operate to reduce the amount of time it takes for the engine to reach an idling speed.

U.S. Pat. No. 5,492,100, issued to Ishii et al. on Feb. 20, 1996, discloses a fuel control device which prevents an internal combustion engine from using all of its cylinders except when a full cylinder operation mode can be reliably changed over from the partial cylinder operation mode. The valves are changed over using a control mechanism which selectively operates the valve change over. The valve change over is operated in a target operation mode selected by the operation mode selector. This patent does not, however, disclose the use of fuel ratios to minimize pollutants exhausted by an internal combustion engine fueled by diesel fuel that will reduce the amount of pollutants exhausted thereby.

SUMMARY OF THE INVENTION

A method for reducing a time period between starting and idling an internal combustion engine having a plurality of cylinders and an injection valve for each of the plurality of cylinders is disclosed. The method includes the steps of measuring a fixed amount of fuel to be injected into each of the plurality cylinders. The position of the injection valve is then measured. A preliminary portion of the fixed amount of fuel is injected into the cylinders when the injection valve is at a first predetermined position. The remaining portion of the fixed amount of fuel is then injected into the cylinders when the injection valve is at a second predetermined position which differs from the first predetermined position.

A second method is disclosed. This method reduces visible exhaust generated by an internal combustion engine having a plurality of cylinders. The internal combustion engine combusts diesel fuel. The second method includes the step of running the internal combustion engine to combust the diesel fuel. The internal combustion engine is then accelerated to reach an idling speed. Diesel fuel is prevented from being combusted by a first predetermined number of the plurality of cylinders once idling speed is reached.

A third method is disclosed. The third method also reduces the visible exhaust generated by an internal combustion engine which combusts diesel fuel in a plurality of cylinders wherein each of the cylinders has at least one injection valve. The third method also reduces noise and vibration. This method includes the steps of running the internal combustion engine to combust the diesel fuel. The internal combustion engine is then accelerated to reach an idling speed. The idling speed is maintained. The diesel fuel is prevented from being combusted by a first predetermined number of the plurality of cylinders in the internal combustion engine. A fixed amount of diesel fuel is measured. A preliminary portion of the fixed amount of diesel fuel is injected when the injection valve is at a first position. The remaining portion of the fixed amount of diesel fuel is injected into the cylinders when the injection valve is at second predetermined position differing from the first predetermined position.

One advantage of the invention is the ability to effectively reduce the time it takes for an internal combustion engine fueled by diesel fuel to reach an idling speed from a cold start. Another advantage associated with the invention is the ability to reduce the time period in which an internal combustion engine may reach an idling speed without modifying the hardware of the engine. Yet another advantage of the invention includes the reduction of pollutants exhausted by the internal combustion engine while the internal combustion engine is attempting to reach an idling speed.

BRIEF DESCRIPTION OF THE DRAWINGS

Other advantages of the invention will be readily appreciated as the same becomes better understood by reference to the following detailed description when considered in connection with the accompanying drawings, wherein.

DESCRIPTION OF THE PREFERRED EMBODIMENT(S)

Figure 1:
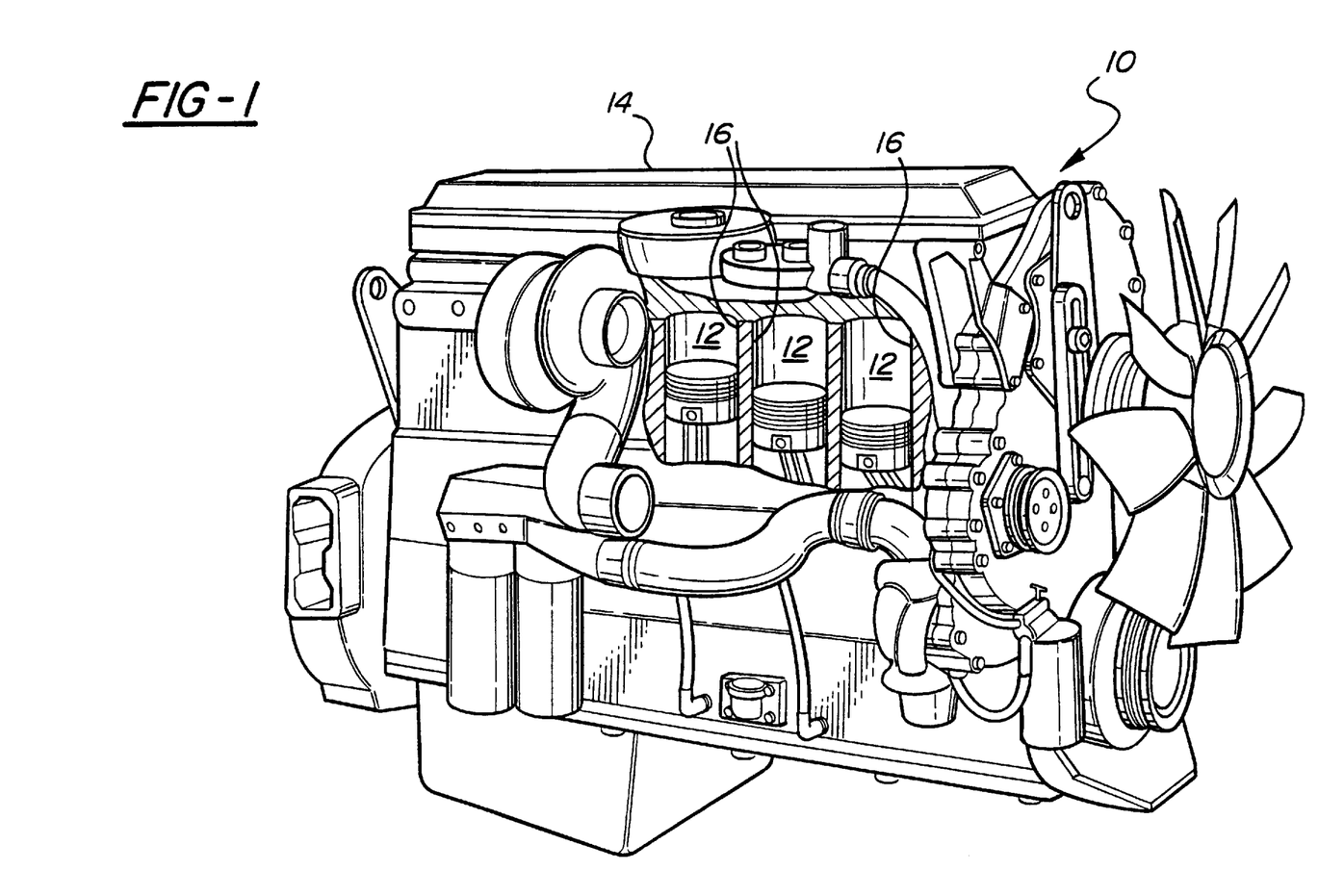
FIG. 1 is a perspective view partially cut away of an internal combustion engine fueled by diesel fuel.

Referring to FIG. 1, an internal combustion engine is generally indicated at 10. The internal combustion engine 10 is of the type which combusts diesel fuel. The diesel fuel is injected or forced into a plurality of cylinders 12 (three of six of the cylinders 12 are shown in the cut-away view). Although there are six cylinders in this embodiment, any number of cylinders may be used. A camshaft housed under the engine head 14 rotates relative to the plurality of cylinders 12 and is used as the mechanism for opening and closing the plurality of cylinders 12 to intake and exhaust manifolds. The camshaft moves at least one injection valve and one exhaust valve per cylinder which open and close inlet and outlet ports leading to and from these manifolds. For purposes of the discussion, the plurality of cylinders 12 is divided into a first half 16 and second half (not shown). Although a camshaft is described as the motion generating device for the injection and exhaust valves, the motion generating device may include a hydraulically actuated mechanism which pushes and pulls the valves. It should be appreciated by those skilled in the art that any suitable device used to translate the valves may be used and is not a part of the present invention.

When the internal combustion engine 10 (hereinafter the diesel engine 10) is operated in a normal fashion, diesel fuel is injected into each of the plurality of cylinders 12 to generate power to rotate a crankshaft (not shown). When the diesel engine 10 is being started, it takes time for the diesel engine to reach an idling speed, approximately 900 RPM in one embodiment. During the period from initial start to the point at which the diesel engine 10 has reached idling speed, the diesel engine 10 exhausts a white smoke. This white smoke is caused by the inefficient, low temperature combustion of fuel by the engine 10 during the period of operation discussed above.

Partial Engine Operation

Figure 2:
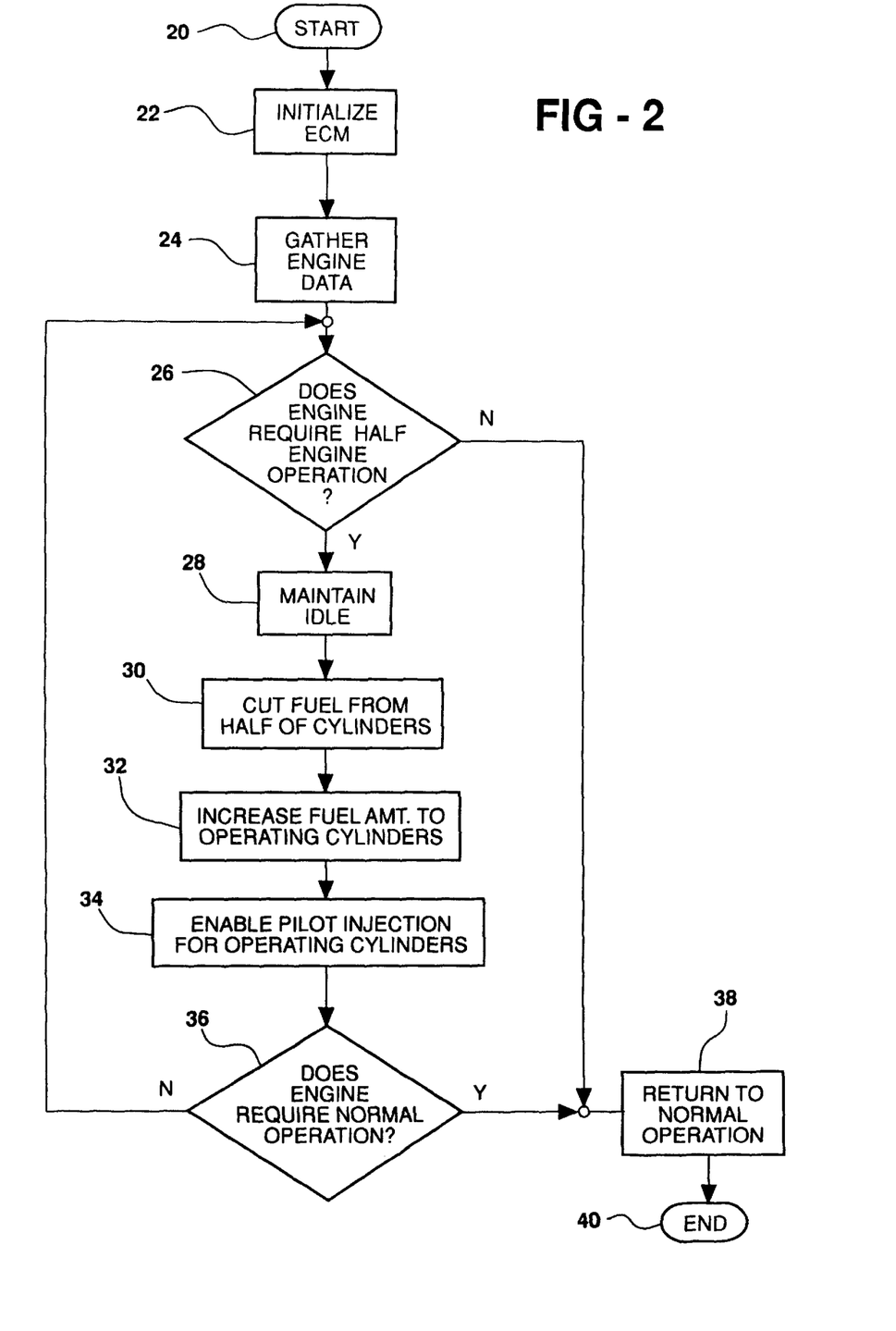
FIG. 2 is a block diagram of a first portion of a method operating a portion of the cylinders of the internal combustion engine.

Turning to FIG. 2, a method is disclosed which substantially reduces the amount of white smoke exhausted by the diesel engine 10 after starting the diesel engine 10. The method is started at 20 wherein the engine control module (ECM) is initialized at 22. Engine data is gathered at 24. The type of engine data which is gathered at 24 is the oil temperature, oil pressure, coolant temperature, RPM, manifold pressures, and the like.

Once the data is gathered, it is determined whether the diesel engine 10 requires partial engine operation, at 26. If partial engine operation is required, the idling speed is maintained at 28. The diesel fuel is then prevented from being combusted by the first predetermined number or portion 16 of the plurality of cylinders 12 at 30. The operating cylinders, namely the second predetermined number or portion of the plurality of cylinders 12 receive the majority of the fuel at 32. In one embodiment, the first and second portions are each one half of the total number of cylinders and the amount of fuel is approximately 80% to 90% of the total amount of fuel which would have been injected into the cylinder during full engine operation. An injection method is enabled for the operating cylinders at 34. The pilot injection method will be discussed in greater detail subsequently. It is then determined, at 36, whether the engine requires normal operation, i.e., full engine operation. If so, the diesel engine 10 is returned to normal operation at 38. Normal operation also occurs when the diesel engine 10 is accelerated past its idling speed. If not, however, more data regarding the diesel engine is gathered at 24. The method is terminated at 40 after the diesel engine 10 has returned to normal operation.

Pilot Injection Method

Figure 3:
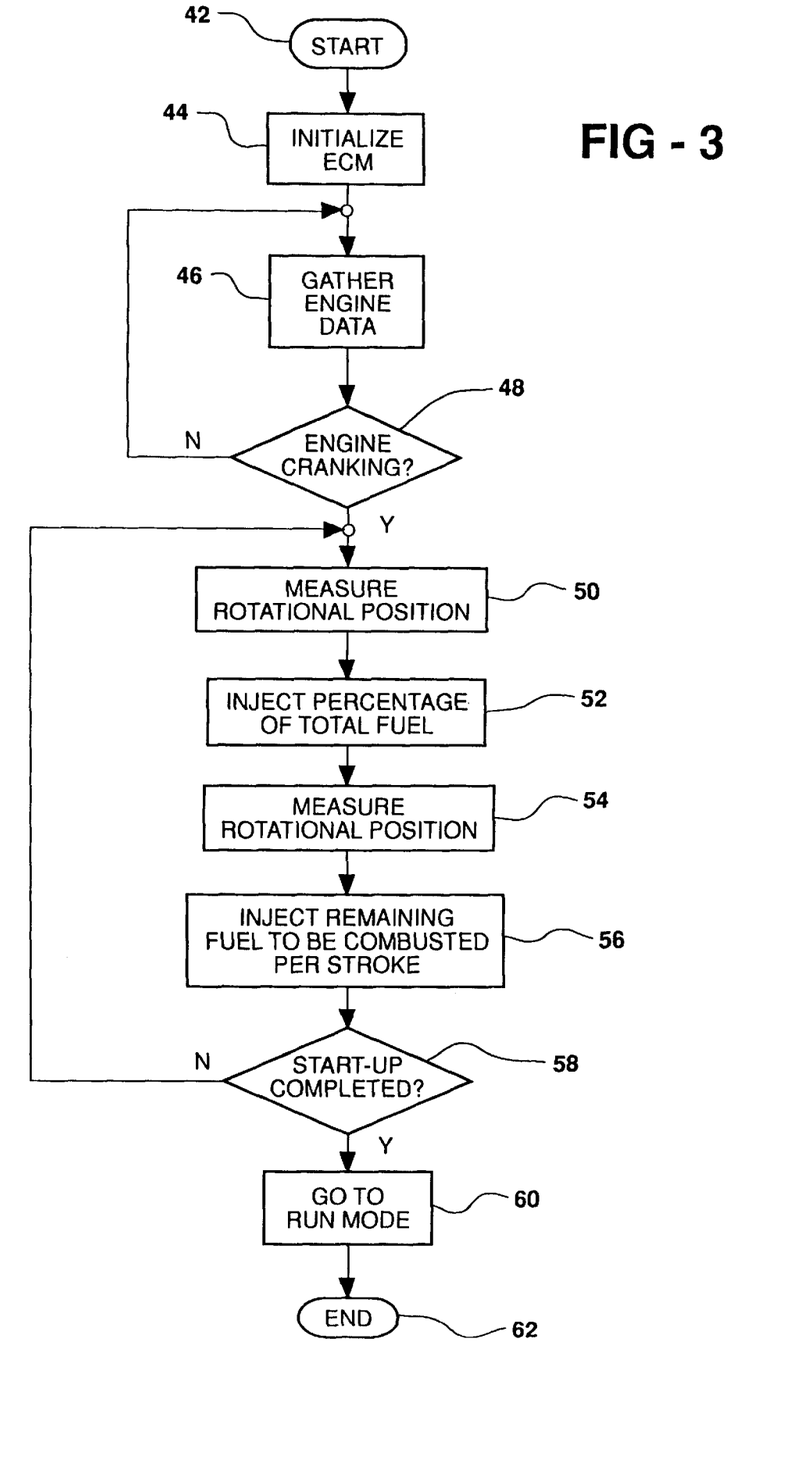
FIG. 3 is a block diagram of a method to inject fuel into a cylinder in a stepped fashion.

Referring to FIG. 3, the electronic pilot injection method is shown in detail. When used separately, the pilot injection method is used to reduce the start-to-idle time. The pilot injection method is started at 42. The engine control module (ECM) is initialized at 44. Engine data, similar to that gathered at 24 in FIG. 2, is gathered at 46. It is then determined whether the engine is cranking at 48. If the engine is not cranking, i.e., running, more engine data is gathered at 46. If the engine is running, the position of the injection or intake valve is measured at 50. At a first predetermined position, a preliminary portion of a fixed amount of diesel fuel is injected into a cylinder corresponding to the first predetermined position. This first injection of the percentage of total fuel is performed at 52. It will be appreciated by those skilled in the art that the first predetermined position is actually a set of positions for a given set of cylinders and wherein a single position is associated with each single cylinder. Therefore, there are as many first predetermined positions as there are cylinders in the diesel engine. In one embodiment, the first predetermined position is between 10° and 20° before top dead center (BTDC). The preliminary portion of the fixed amount of diesel fuel injected at this first predetermined position is approximately 5 to 15 percent of the fixed amount of diesel fuel.

The position of the intake valve is measured again at 54. A remaining portion of the fixed amount of diesel fuel is injected into a cylinder when the camshaft is at a second predetermined position which differs from the first predetermined position. This injection of the remaining amount of diesel fuel is performed at 56. The remaining portion of diesel fuel may be the total amount of remaining fuel which would have been used in that particular cylinder at the time when the electronic pilot injection method is not being used. Alternatively, the fixed amount of injected diesel fuel may be reduced to 80 or 90 percent of the total amount of fuel designed to be consumed or combusted in that cylinder at that time. Once the remaining amount of fuel has been combusted per that stroke, it is determined whether the start-up has been completed at 58. If it has not been completed, the first measurement of the position is taken again at 50. If the start-up has been completed, the method instructs the engine control module to enter a run mode at 60, a mode capable of running at a high RPM, accelerating or idling whereafter the method is terminated at 62.

Figure 4:
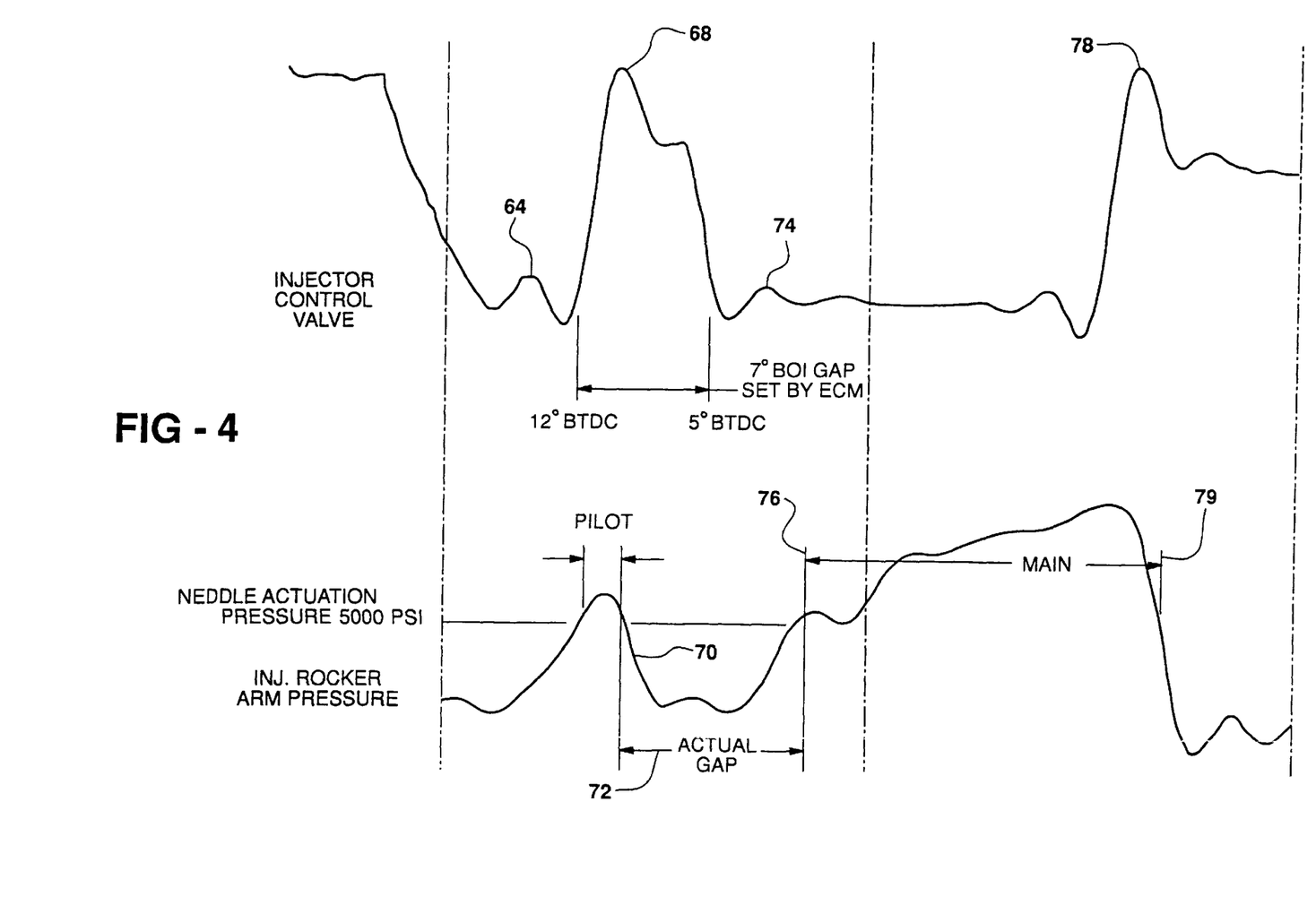
FIG. 4 is a graphic representation of the output when performing the method of FIG. 3.

With regard to the electronic pilot injection method and referring to FIG. 4, it is shown that a control valve (discussed subsequently) controls an injection rocker arm pressure which is used to open the inlet valve allowing diesel fuel to enter the cylinder to be combusted. The control valve is closed at 64. As pressure builds up along line segment 66, the injection rocker arm pressure also builds. When enough pressure in the control valve forces the injection rocker arm pressure to exceed a needle actuation pressure, 5,000 psi in one embodiment, the pilot, or preliminary portion, of diesel fuel is injected into the cylinder. The control valve is opened at 68 relieving the pressure in the injection rocker arm, at 70. Once the injection rocker arm pressures drops below the needle actuation pressure, the pilot is terminated. In one embodiment the control valve, in this embodiment, is closed between 12° BTDC and 5° BTDC creating a 7° difference to define an actual gap in the injection rocker arm pressure 72. The control valve is closed again at 74 allowing pressure in the injection rocker arm to increase. The main injection or the remaining portion of the fixed amount of diesel fuel is injected into the cylinder beginning at 76 and continues to be injected until the control valve is opened at 78 where the main injection ceases at 79.

Figure 5:
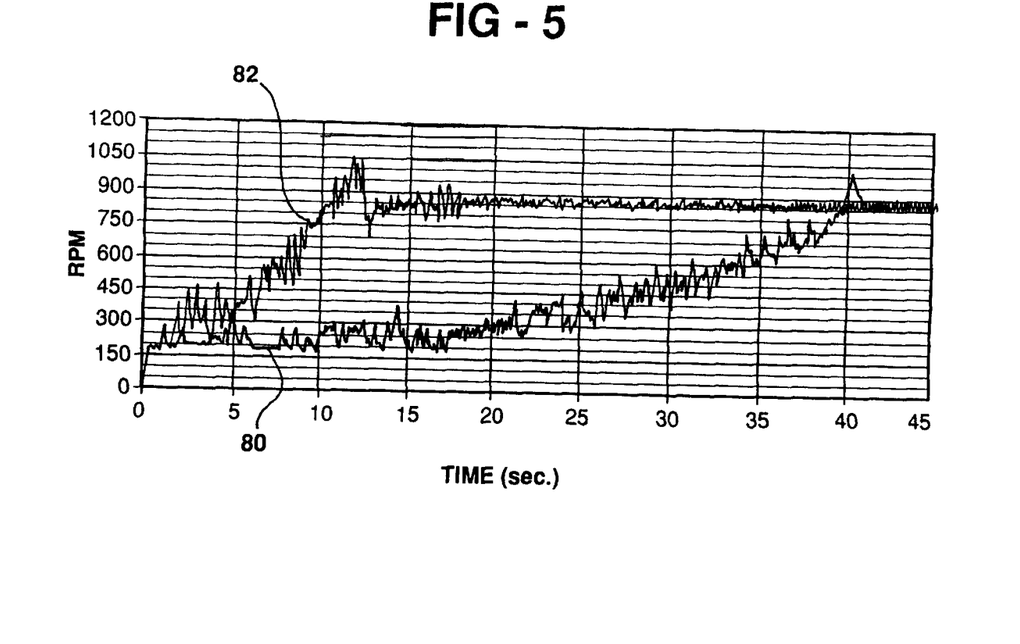
FIG. 5 is a graphic representation of the start-to-idle time for one type of internal combustion engine using the method of FIG. 3 compared with the start-to-idle time for the same internal combustion engine not using the method of FIG. 3.
Figure 6:
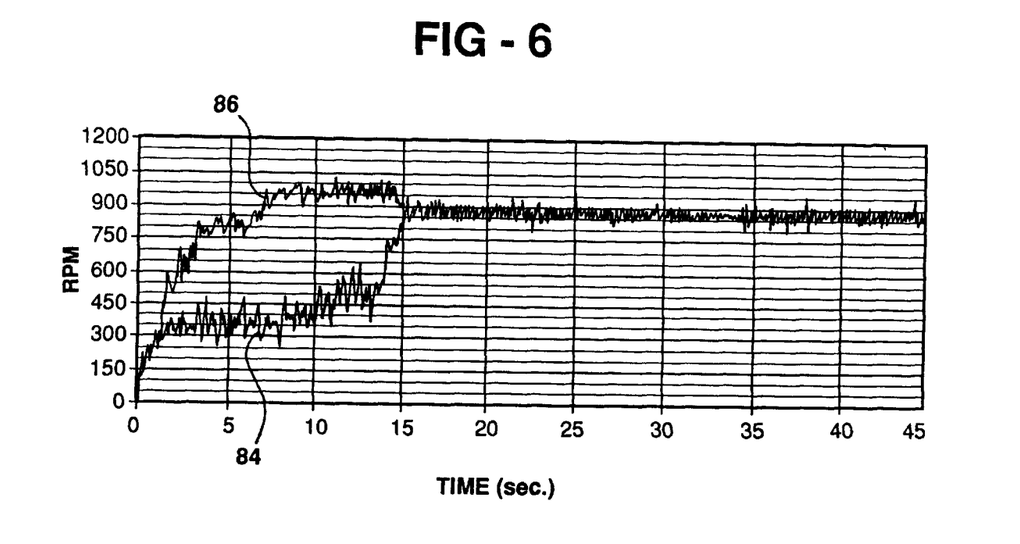
FIG. 6 is a graphic representation of the start-to-idle time for a second type of internal combustion engine using the method of FIG. 3 compared with the start-to-idle time for the same internal combustion engine not using the method of FIG. 3.

FIGS. 5 and 6 show two different internal combustion engines of differing displacements, respectively. A first line 80 shows the first internal combustion engine reaching a stable idle speed in approximately forty seconds. Employing the pilot injection method, the same internal combustion engine reaches the same idle speed in approximately thirteen seconds, shown by line 82. In FIG. 6, a similar comparison is made wherein lines 84 and 86 are an internal combustion engine reaching idle speed without and with the utilization of the pilot injection method, respectively.

Pilot Injection—Partial Engine Method

The electronic pilot injection method is discussed above in detail and shown in FIG. 3. The method is used in two different manners at two separate and distinct times between start-up and idling the diesel engine 10. First, as discussed above, the electronic pilot injection method is used independently from the partial cylinder method. In this manner, the electronic pilot injection method is used prior to reaching an idling speed, i.e., immediately after a cold start. This method is used in this manner to reduce the time it takes for the diesel engine 10 to reach an idling speed after a cold start-up. Therefore, the electronic pilot injection method can be employed initially at start-up to reduce the amount of time required to reach an idling speed.

Figure 9:
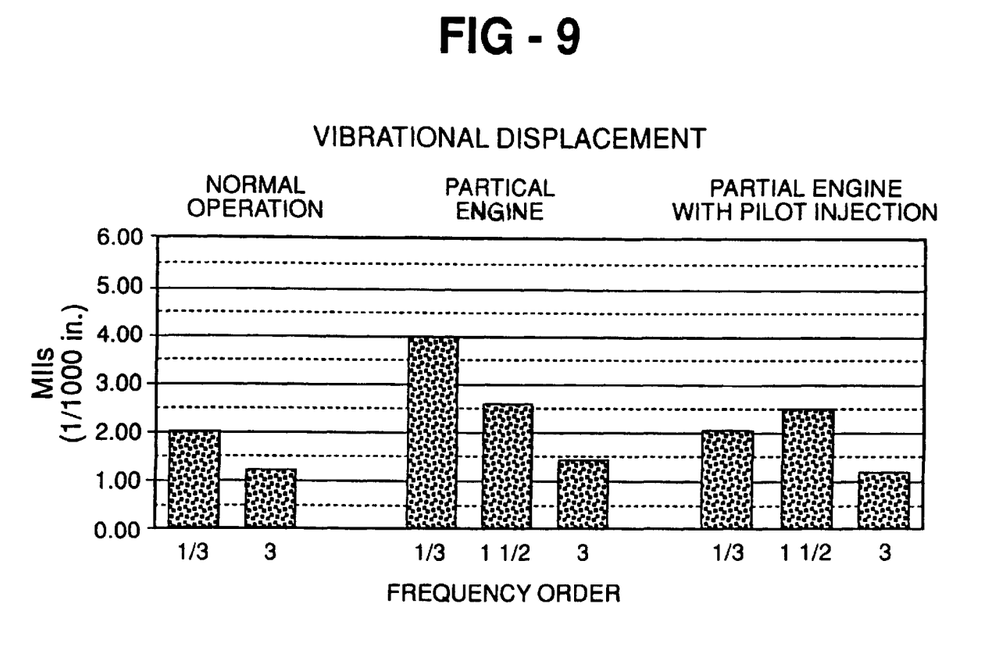
FIG. 9 is a graphic representation of a comparison of vibrational displacements for an internal combustion engine during normal operation, using the method of FIG. 2, and using the method of FIG. 3, respectively.
Figure 10:
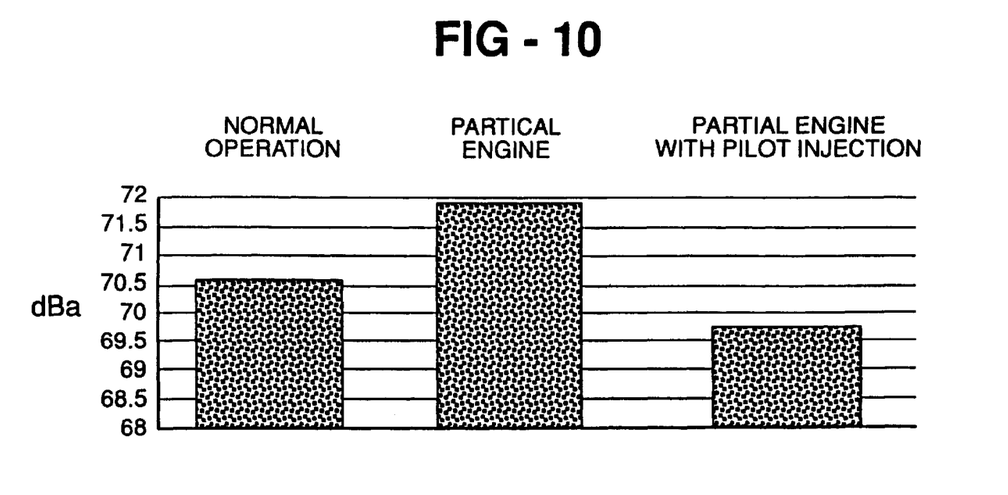
FIG. 10 is a graphic representation of a comparison of noise levels found in a passenger compartment of a motor vehicle having an internal combustion engine during normal operation, using the method of FIG. 2, and using the method of FIG. 3, respectively.

Alternatively, the electronic pilot injection method is used in combination with the partial cylinder operation method to reduce the noise and vibration of the diesel engine 10 while operating in the partial cylinder mode as is generally shown at 34 in FIG. 2. These reductions in noise and vibration are graphically represented in FIGS. 9 and 10. In this manner of operation, the electronic pilot injection method is used primarily after the diesel engine 10 has reached an idling speed when it is used in combination with the partial cylinder method.

Figure 7:
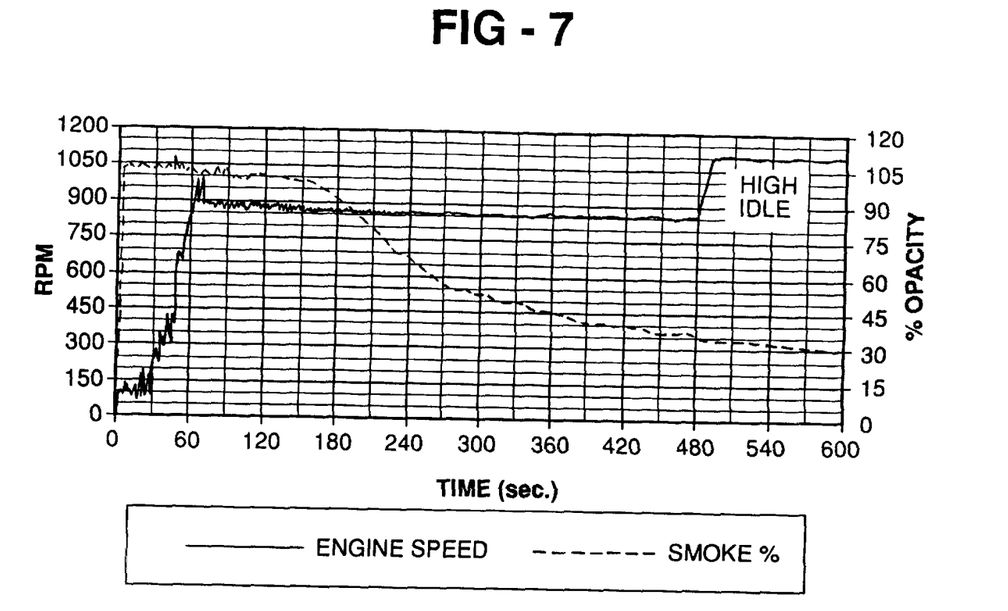
FIG. 7 is a graphic representation of the output of exhaust white smoke for an internal combustion engine known in the prior art.

Referring to FIG. 7, data is shown in graphic representation wherein the engine speed in the related art reaches 900 RPM at approximately 60 seconds for a cold start, whereafter it idles for approximately 480 seconds. The percentage of opacity of the white smoke is shown to reach 90% almost immediately. Thereafter, the percentage of opacity of white smoke decreases slowly until it reaches 30% opacity after 600 seconds. This data was accumulated on diesel engine operation using all of the cylinders in a conventional manner.

Figure 8:
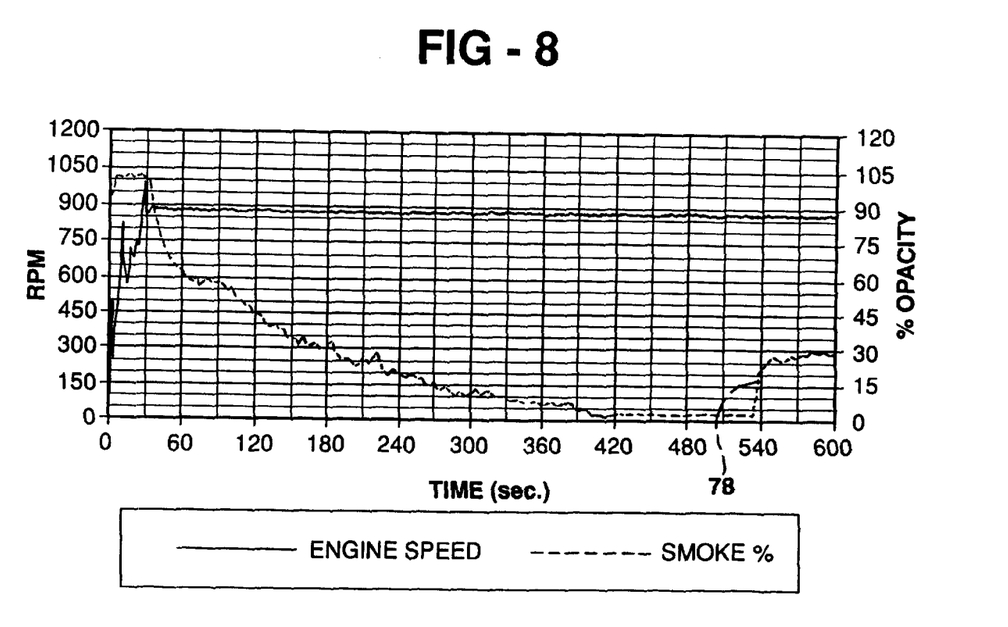
FIG. 8 is a graphic representation of the exhaust white smoke using the method of FIG. 2 in combination with the method of FIG. 3.

On the other hand, using the half engine method along with the electronic pilot injection method, the output of white smoke is graphically presented in FIG. 8. As illustrated in this Figure, the percentage opacity of the white smoke never reaches a value equal to the maximum percentage of opacity obtained when starting the diesel engine 10 without the half engine operation. Further, the percentage opacity drops off drastically and continues to reduce to almost zero percent until, at 78, the full engine is employed wherein the percentage opacity jumps to 30%.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A method for reducing visible exhaust generated by an electronically controlled internal combustion engine combusting diesel fuel having a plurality of electronic unit injectors, one of each injectors associated with one of each of a plurality of cylinders and at least one injection valve, the method comprising the steps of:

running the internal combustion engine to combust the diesel fuel;

accelerating the internal combustion engine to reach an idling speed;

maintaining the idling speed;

preventing the diesel fuel from being combusted by a first predetermined number of the plurality of cylinders by electronically controlling a solenoid valve in each of the associated electronic fuel injectors to prevent fuel flow therethrough;

measuring a fixed amount of the diesel fuel to be injected into the second predetermined number of the plurality of cylinders;

injecting a preliminary portion of the fixed amount of diesel fuel by determining when the injection valve is at a first position; and injecting the remaining portion of the fixed amount of diesel fuel into the second predetermined number of the plurality of cylinders when the injection valve is at a second predetermined position differing from the first predetermined position.

2. A method as set forth in claim 1 wherein the first predetermined number of the plurality of cylinders equals a first half of the plurality of cylinders.

3. A method as set forth in claim 2 including the step of providing the diesel fuel to the first half of the plurality of cylinders when the internal combustion engine accelerates past the idling speed.

4. A method as forth in claim 3 including the step of collecting data defining performance of the internal combustion engine.

* * * * *